US009018555B2

(12) United States Patent
Ray

(10) Patent No.: US 9,018,555 B2
(45) Date of Patent: Apr. 28, 2015

(54) SECURITY COVER PLATE FOR LIGHT SWITCH

(71) Applicant: Robin A. Ray, Labadie, MO (US)

(72) Inventor: Robin A. Ray, Labadie, MO (US)

( * ) Notice: Subject to any disclaimer, the term of this patent is extended or adjusted under 35 U.S.C. 154(b) by 93 days.

(21) Appl. No.: 13/649,206

(22) Filed: Oct. 11, 2012

(65) Prior Publication Data

US 2013/0092516 A1    Apr. 18, 2013

Related U.S. Application Data

(60) Provisional application No. 61/546,544, filed on Oct. 12, 2011.

(51) Int. Cl.
*H01H 1/52* (2006.01)
*H01H 3/20* (2006.01)
*H01H 9/00* (2006.01)
*H02G 3/14* (2006.01)
*H01H 21/06* (2006.01)

(52) U.S. Cl.
CPC . *H02G 3/14* (2013.01); *H01H 1/52* (2013.01); *H01H 21/06* (2013.01)

(58) Field of Classification Search
CPC .............. H01H 1/52; H01H 3/20; H01H 9/00
USPC .......... 200/293, 294, 296, 297, 302.1, 302.3, 200/345, 322, 330, 331, 332.1, 333, 336, 200/572; 174/66, 67
See application file for complete search history.

(56) References Cited

U.S. PATENT DOCUMENTS

| 4,468,544 | A | * | 8/1984 | Wainess et al. | 200/43.16 |
|---|---|---|---|---|---|
| 4,876,425 | A | * | 10/1989 | Woskow | 200/43.16 |
| 5,219,070 | A | * | 6/1993 | Grunert et al. | 200/330 |
| 5,324,897 | A | * | 6/1994 | Melgoza et al. | 200/43.11 |
| D353,580 | S | * | 12/1994 | Woehler | D13/173 |
| D372,224 | S | * | 7/1996 | Larned et al. | D13/173 |
| 5,955,702 | A | * | 9/1999 | Grossman et al. | 174/66 |
| 6,051,785 | A | | 4/2000 | Baldwin et al. | |
| 7,122,753 | B1 | | 10/2006 | Davis | |

OTHER PUBLICATIONS

Hubbell, Gray outdoor cover switch, Model 5965-1; website http://www.doitbest.com/Wall+plates-Hubbell-model-5965-1-doitbest-sku-511447.dib; retrieved May 13, 2011.

* cited by examiner

*Primary Examiner* — Edwin A. Leon
*Assistant Examiner* — Anthony R. Jimenez
(74) *Attorney, Agent, or Firm* — Husch Blackwell LLP; Mark E. Stallion, Esq.

(57) ABSTRACT

An light switch cover plate constructed of a durable and ruggedized break-resistant material that securely covers the light switch switching mechanism and includes, uniquely keyed mounting members, and a uniquely keyed switching implement operably connected to a switching lever to effect switching on and off the light switch switching mechanism.

7 Claims, 3 Drawing Sheets

SECURITY COVER PLATE FOR LIGHT SWITCH

CROSS-REFERENCE TO RELATED APPLICATIONS

This disclosure claims priority to an earlier filed Provisional Patent application No. 61/546,544 filed Oct. 12, 2011 entitled SECURITY COVER PLATE FOR LIGHT SWITCH, which is hereby incorporated herein in its entirety.

BACKGROUND OF INVENTION

1. Field of Invention

This invention relates generally to light switches and, more particularly, to cover plates for light switches.

2. Background Art

Wall switches and their cover plates are available in a range of sizes, types and designs. Typically, these switches are mounted onto walls for easy access to those electrical outlets, light fixtures and devices that are electrically connected to an electrical source. Mounting of switches is achieved by running power lines to utility boxes mounted to wall structures adjacent to the wall surface. The utility boxes house the switch assembly. The utility box usually has an open front face for front installation and wiring of the switch. Such boxes are then available for receiving electric switches, typically of the toggle type, whereby the switches are mechanically mounted to the box usually with screw and the switch is electrically wired to the power lines. The switch and utility box with its wires are then covered by a wall mounted cover plate that is often made of a hard plastic material that is ivory colored, with occasionally an optional dark brown or white in color, having two circular holes for locating two threaded screws or other more secure attachment means and a centrally located rectangular slot to accommodate a toggle bat. A major drawback to cover plates, however, has been the lack of security. The cover plates are easily removed or broken to thereby expose electrical wires. Once the electrical wires are exposed there is a risk of shock and a fire hazard is created. The cover plates can be broken by accident or can be broken intentionally.

Intentional breakage and removal of light switches has been an on-going problem in correctional institutions where inmates for whatever reason wish to gain access to electrical power. Whether the motivation is to harm another inmate, create a fire hazard, or simply access power for an electronic device, the results can be catastrophic. A cover design is needed to adequately secure the light switch and the electrical connections thereto.

BRIEF SUMMARY OF INVENTION

The invention is a light switch cover plate constructed of a durable and ruggedized break-resistant material that securely covers the light switch mechanism and includes a uniquely keyed control head connected to a switching implement operably positioned to effect switching on and off the light switch switching mechanism.

One implementation of the cover plate apparatus includes a cover plate assembly adapted to be securely mounted over a light switch where a facing front wall of said cover plate assembly includes an outwardly protruding switch cavity wall portion forming a posterior facing hollow interior switch cavity sufficiently sized to receive an electromechanical switch device therein and where said cover plate assembly includes a control head extending from the front wall of said cover plate assembly and operatively connected to a mechanical implement located on the posterior side of the cover plate assembly to effect movement of said implement from a first position to a second position and from the second position to the first position, whereby in one implementation the control head can have a unique keyed recess for receiving a key and operable to rotate when a key is inserted in said keyed recess and turned from the first position to the second position and from the second position to the first position.

These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1:
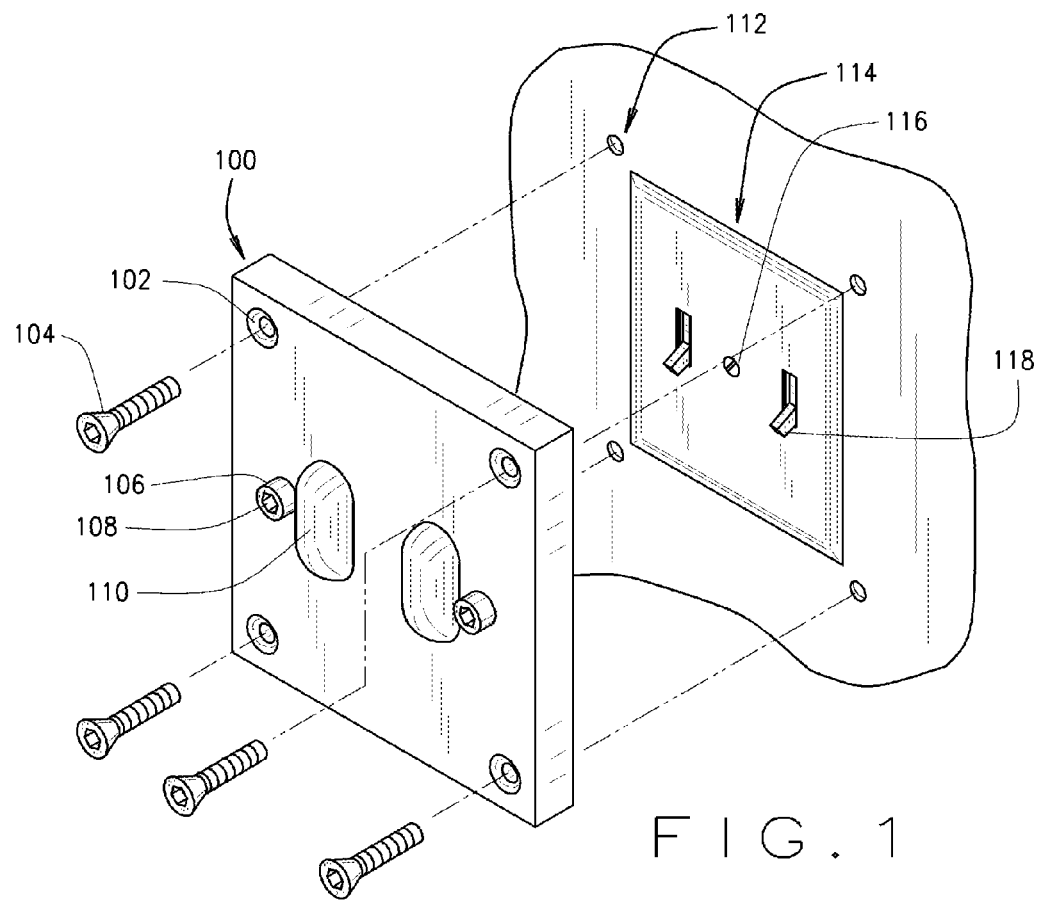
FIG. 1 is a perspective view of a light switch cover.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

Item List
   100 Cover Plate Assembly
   102 Countersunk Mounting Hole
   104 Fastener
   106 Control Head
   108 Keyed Recess
   110 Switch Cavity Wall
   112 Wall Mounting Hole
   114 Standard Cover Plate
   116 Standard Cover Plate Fastener
   118 Electromechanical Switch Device
   302 Switch Cavity
   304 Mechanical Implement
   306 Pivot
   308 Cover Plate Assembly Cut-Out
   310 Enlarged Cut-Out In Thicker Material Stock

DETAILED DESCRIPTION OF INVENTION

According to the embodiment(s) of the present invention, various views are illustrated in FIG. 1-9 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising secure light switch cover plate teaches a novel apparatus for securing a light switch to prevent unwanted access to the electrical connections. One implementation of the cover plate apparatus includes a cover plate assembly adapted to be securely mounted over a light switch where a facing front wall of said cover plate assembly includes an outwardly protruding switch cavity wall portion forming a posterior facing hollow interior switch cavity sufficiently sized to receive an electromechanical switch device therein and where said cover plate assembly includes a control head extending from the front wall of said cover plate assembly and operatively connected to a mechanical implement located on the posterior side of the cover plate assembly to effect movement of said implement from a first position to a second position and from the second position to the first position, whereby in one implementation the control head can have a unique keyed recess for receiving a key and operable to rotate when a key is inserted in said keyed recess and turned from the first position to the second position and from the second position to the first position.

The details of the invention and various embodiments can be better understood by referring to the figures of the drawing. Referring to FIG. 1, a perspective view of a light switch cover embodiment is shown. The cover plate assembly 100 is shown having four countersunk mounting holes 102. The countersunk mounting holes 102 can be designed to interface and align with wall mounting holes 112. The mounting holes 112 can be reinforced to securely mount the cover plate assembly to the wall. Alternatively, the countersunk mounting holes 102 can be configured to be aligned with mounting holes of the electrical box which contains the electrical switch. Yet another embodiment could include a configuration where the countersunk mounting holes are aligned with the standard mounting holes for a standard cover plate. The cover plate assembly can be mounted using a fastener 104. The fastener as shown illustrates a screw having a countersunk flat head such as that the head will be flush with the surface of the cover plate when installed. Other fastener devices can be used such as bolts or rivets.

The cover plate assembly 100 is also shown including control heads 106 utilized for effecting control of the electromechanical switch device 118 (toggle switch, bat switch). The control head 106 can be designed to transition from a off position to a on position. The control head 106 shown is illustrated in this embodiment as a rotational control knob having a keyed recess 108. The rotational control knob can have a detent on opposing ends of the arc of rotation of the control knob to provide a positive indicator of the maximum range of motion. The keyed recess can have a uniquely designed pattern or can be a standard allen wrench hex pattern. The specially designed key or allen wrench can be inserted into the keyed recess 108 to thereby turn the control head from the off position to the on position and from the on position to the off position. As indicated above a detent can be provided at the on position of the knob and the off position of the knob to provide a positive indicator to the operator. The control head may vary in geometry including but not limited to varying its length and diameter. The control head, in one embodiment of the cover plate assembly, may be recessed within the face plate of the cover plate assembly.

Also shown in this illustration is a switch cavity wall 110 which has an interior switch cavity for housing and containing the electrical mechanical switch device 118. The elctromechanical switch device 118 is illustrated here as a standard toggle switch or bat switch that is utilized in a standard electrical switch. The control head 106 can be utilized to effect movement of the electro-mechanical switch device from an on position to an off position and from an off position to an on position. As a further illustration a standard cover plate is shown installed over the electrical switch utilizing a standard cover plate fastener 116.

The standard cover plate 114 can be installed and the cover plate assembly 100 can be installed over the standard cover plate. However, the standard cover plate 114 can be removed completely and the cover plate assembly 100 can be installed over the electrical switch. The cover plate assembly can be manufactured utilizing a durable tamper resistant material such as metal or other durable tamper resistant material. The gauge of the material can be designed such that it resists breakage due to impact of other forces being applied. The fasteners 104 can be attached or mated to a reinforced interface such as a metal plate or a metal electrical box. Fasteners such as screws can have a countersunk flat head for a flush mount and can have a uniquely keyed recess such that they can only be removed utilizing a special tool. The switch cavity wall can cover the electro-mechanical switch device such that it cannot be accessed or broken off.

Figure 2:
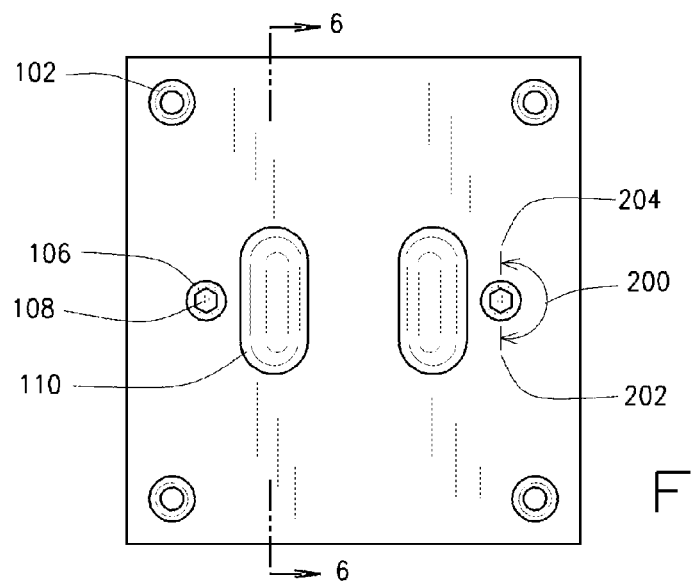
FIG. 2 is the front elevation view of the light switch cover.

Referring to FIG. 2, a front elevation view of a light switch cover embodiment is shown. The front elevation view shown in FIG. 2 further reveals the countersunk mounting holes 102, the control head 106 with the keyed recess 108 and the switch cavity wall 110. Also shown in FIG. 2 is a rotational arrow 200 which illustrates the rotational direction of the control head when rotated from an on position 202 to a off position 204. Other control heads can be utilized to control the mechanical implement to effect switching the electro-mechanical switching device from an off position to an on position without departing from the scope of the present invention. The control head can be connected to the mechanical implement by a transfer member (transfer stem) 306 such that when the control head is rotated it effects rotation of the transfer stem which in turn effects rotation of the mechanical implement.

Figure 3:
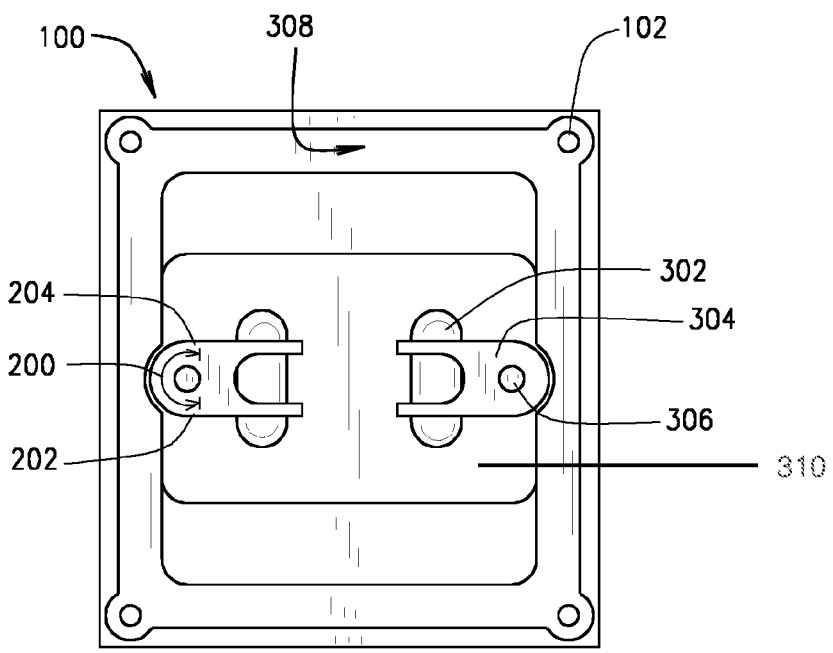
FIG. 3 is the rear elevation view of the light switch cover.

Referring to FIG. 3, a rear elevation view of a light switch cover embodiment is shown. The rear elevation view of the cover plate assembly 100 reveals a rear cover plate assembly cut out 308 which receives and covers the electrical switch. This rear elevation view also reveals the rear of the countersunk mounting holes 102 utilized for mounting the cover plate assembly. The rear elevation view also reveals the switch cavity 302 formed by the switch cavity wall 110, which is sufficiently sized to contain the electro-mechanical switch device and allow free movement of the electro-mechanical switching device from an off position to an on position and from an on position to an off position. The switch cavity wall 110 is shown protruding beyond the outward facing surface of the cover plate assembly 100, thereby forming a posterior switch cavity 302 for containing the switch. In one implementation, a thicker material stock for the cover plate assembly could be utilized such that the thickness (depth) of the material from the facing surface of the cover plate assembly to the rear-most posterior surface such that the depth is sufficient to allow for the recessed area generally indicated by 310 to have a greater depth sufficient to receive the electro-mechanical switch (switching mechanism). The enlarged cut-out 310 has sufficient depth to accommodate the switch. The depth can be similar to that of the posterior switch cavity, thereby allowing for free movement of the switch. See an illustration of this implementation in FIGS. 7-9. This implementation eliminates the need for the protruding switch cavity wall 110 as with the implementation illustrated in FIGS. 1-6.

This view also reveals the mechanical implement 304 which in this embodiment is illustrated as a lever mechanical implement having a u-shaped fork for interfacing with the electro-mechanical switch device. This embodiment also reveals a pivot 306 about which the lever rotates to allow transition from an off position to an on position. The rotational arrow 200 again reflects or illustrates how the mechanical implement 304 can be rotated or pivoted to transition from an on position 202 to an off position 204 and from an off position 204 to an on position 202. The opposing legs of the u-shaped fork can be configured with a sufficient spread apart one with respect to the other and with sufficient lengths to straddle the electromechanical switch such that one of the opposing legs is positioned on opposing upper and lower sides of the electromechanical switch. The leg positioned above the upper side can urge the electromechanical switch down-ward when the control know is rotated counter-clockwise, thereby rotating the transfer stem and the mechanical implement counter-clockwise. The leg positioned below the lower side can urge the electromechanical switch up-ward when the control know is rotated clockwise.

Figure 4:
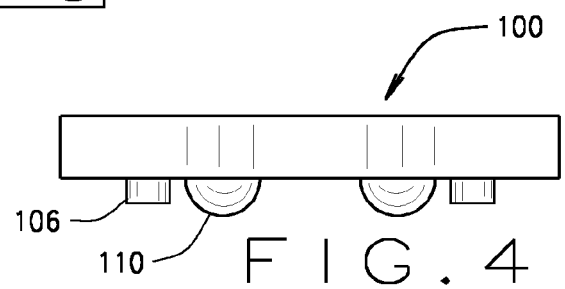
FIG. 4 is the top view of the light switch cover.

Referring to FIG. 4, a top view of a light switch cover embodiment is shown. The top view of the cover plate assembly 100 further reveals the control head 106 from a top view and the switch cavity wall 110 from a top view. The switch cavity wall 110 can protrude sufficiently to allow an adequate cavity for housing the electro-mechanical switch device and to allow free movement of the device from an on position to an off position.

Figure 5:
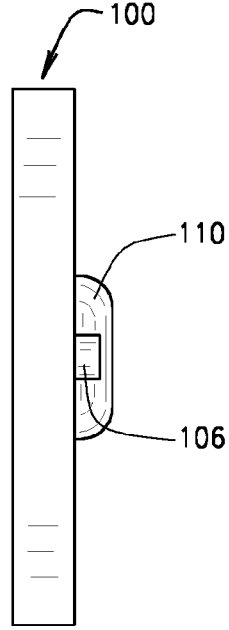
FIG. 5 is the side view of the light switch cover.

Referring to FIG. 5, a side view of a light switch cover embodiment is shown. The side elevation view of the cover plate assembly 100 illustrates in a similar matter the control head 106 and protrusion of the switch cavity wall 110.

Figure 6:
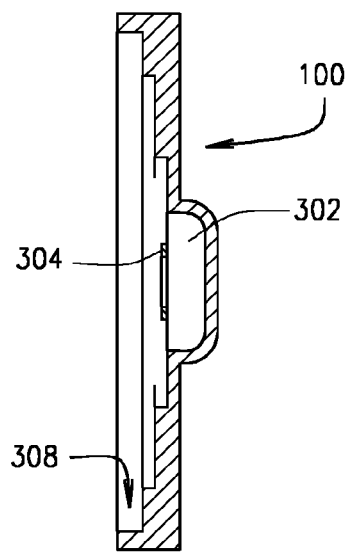
FIG. 6 is the side sectional view of the light switch cover.
Figure 7:
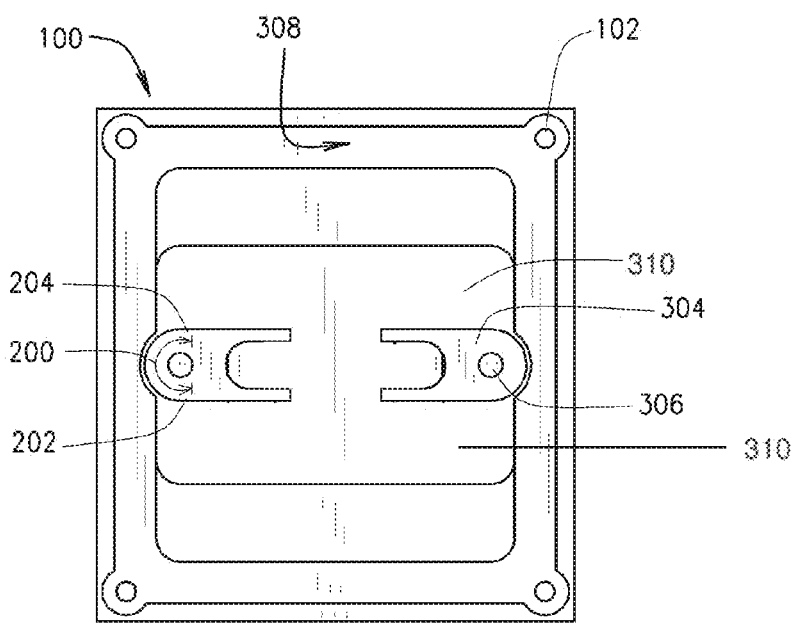
FIG. 7 is the rear elevation view of the light switch cover with thicker material stock.
Figure 8:
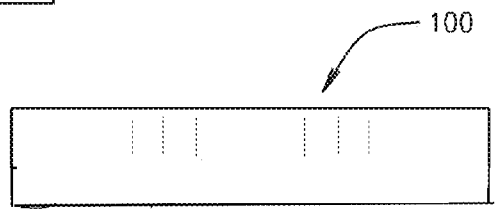
FIG. 8 is the top view of the light switch cover with thicker material stock.
Figure 9:
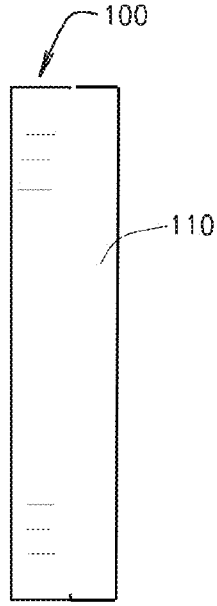
FIG. 9 is the side view of the light switch cover with thicker material stock.

Referring to FIG. 6, a side sectional view of a light switch cover embodiment is shown. This side sectional view of the cover plate assembly 100 reveals the cut out 308 which provided sufficient space to cover the electrical switch as well as allow the standard cover plate to be installed. This sectional view also reveals the switch cavity 302 which is sufficiently sized to receive the electro-mechanical switch device and allow free movement of the device. A side sectional view of the mechanical implement 304 is also shown.

The various light switch cover examples shown above illustrate a novel apparatus for securing the electrical connections of a light switch. A user of the present invention may choose any of the above light switch cover embodiments, or an equivalent thereof, depending upon the desired application. In this regard, it is recognized that various forms of the subject light switch cover plate could be utilized without departing from the spirit and scope of the present invention including but not limited to a single or multiple switch embodiment.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An apparatus comprising:
a cover plate assembly sized to be securely mounted over a cover plate of a light switch where a facing front wall of said cover plate assembly includes an outwardly protruding switch cavity wall portion forming a posterior facing hollow interior switch cavity sufficiently sized to receive an electromechanical switch device therein and where said cover plate assembly includes a control head extending from the front wall of said cover plate assembly and operatively connected to a mechanical implement located on the posterior side of the cover plate assembly to effect movement of said implement from a first position to a second position along a first linear axis and from the second position to the first position along said first linear axis, said mechanical implement having a center of rotation located adjacent said light switch and adjacent said first linear axis.

2. The apparatus as recited in claim 1, where said control head has a keyed recess for receiving a key and operable to rotate when the key is inserted in said keyed recess and turned from the first position to the second position and from the second position to the first position.

3. The apparatus as recited in claim 2, where the cover plate assembly is constructed of metal.

4. An apparatus comprising:
a cover plate assembly having a front accessible rotatable control knob connected by a transfer stem to a rotatable mechanical implement contained in a posterior recess of the cover plate assembly, where said posterior recess is of sufficient volume to receive a standard light switch cover plate therein, and where said mechanical implement has opposing u-shaped legs extending orthogonally from the mechanical implement with respect to the transfer stem such that the opposing u-shaped legs are positioned to straddle a standard light toggle switch when said cover plate assembly is mounted over the standard light switch cover plate to effect movement of said rotatable mechanical implement from a first position to a second position along a first linear axis and from the second position to the first position along said first linear axis, said rotatable mechanical implement having a center of rotation located adjacent said light switch and adjacent said first linear axis.

5. The apparatus as recited in claim 4, where said rotatable control knob has a keyed recess for receiving a key and operable to rotate when the key is inserted in said keyed recess and turned from a first position to a second position and from the second position to the first position.

6. The apparatus as recited in claim 1, wherein said mechanical implement comprises u-shaped legs.

7. The apparatus as recited in claim 6, wherein said u-shaped legs extend along a direction substantially perpendicular to said first linear axis in said first or said second position.

* * * * *